United States Patent [19]

Wartburg

[11] Patent Number: 4,866,747
[45] Date of Patent: Sep. 12, 1989

[54] DEVICE FOR MEASURING THE THICKNESS OF THIN COATINGS

[76] Inventor: August Von Wartburg, Moosmattstrasse 1, CH-6331 Hunenberg, Switzerland

[21] Appl. No.: 142,740

[22] Filed: Jan. 11, 1988

[30] Foreign Application Priority Data

Apr. 1, 1987 [DE] Fed. Rep. of Germany ....... 3710437

[51] Int. Cl.⁴ .............................................. G01B 15/02
[52] U.S. Cl. ....................................... 378/50; 378/205
[58] Field of Search ..................... 378/50, 54, 55, 56, 378/205

[56] References Cited

U.S. PATENT DOCUMENTS 4,534,049  8/1985  Koga .................................... 378/50
4,597,093  6/1986  Fischer ................................. 378/50

Primary Examiner—Craig E. Church

[57] ABSTRACT

An instrument for measuring thin layer thickness according to the X-ray fluorescence method. Such device has means for observing the area of the surface of the layer through which the geometrical central axis of the X-rays pass, and a table for supporting objects which are to be measured, which has a portion defining a cut-out around the geometrical central axis. The device has illuminating means for lighting the surface through the cut out. An electronic eye is located in the path of light rays from the illuminating means on the ocular side. An image screen is controlled by the electronic eye. Depressor means is provided above the cut-out and has a pressure-applying face adapted for movement between an upper and a lower position, the upper position being at least high enough that the object to be measured can be pushed between the pressure-applying face and the table. The pressure-applying face is adapted to apply force when in the lower position to press the object to be measured against the top of the table and hold the object in a non-positive manner. Switchable means is provided for moving the depressor means in the upper and the lower positions. The pressure-applying face is located about the geometrical central axis of the X-rays, the distance between the pressure-applying face and the geometrical central axis being far less than the distance from the geometrical central axis to the edge of the table. The cut-out in the table has a very much larger area than the cross-section of the X-ray beam.

33 Claims, 5 Drawing Sheets

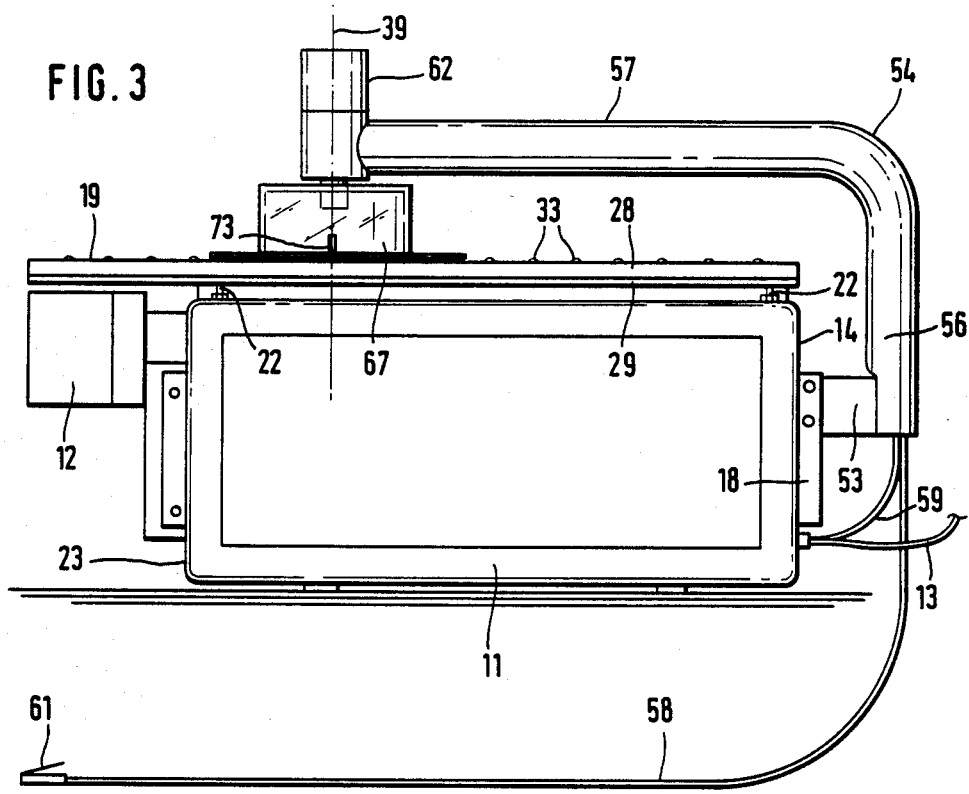
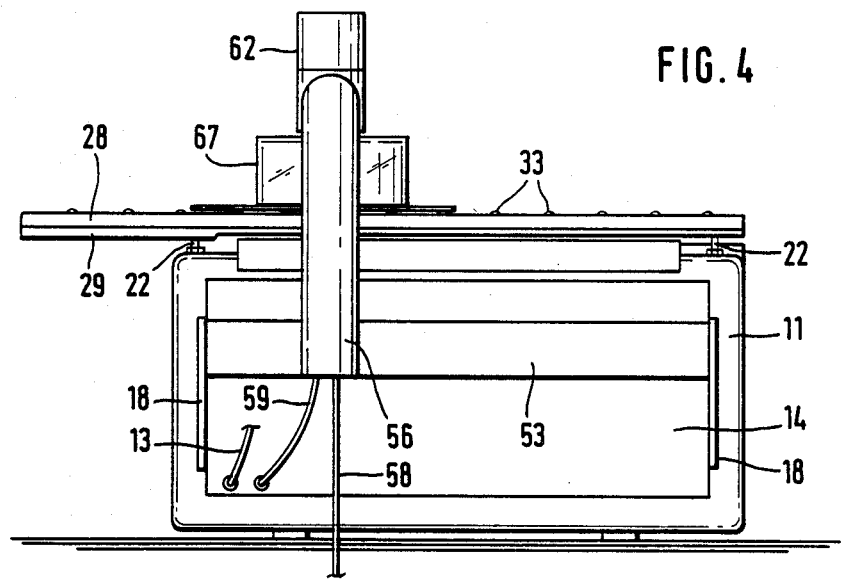

DEVICE FOR MEASURING THE THICKNESS OF THIN COATINGS

This invention related to a device for an instrument for measuring the thickness of thin layers according to the X-ray fluorescence method. Such device has viewing means having a viewing position for observing the area of the surface of the layer through which the geometrical central axis of the X-rays pass, and support means for supporting objects which are to be measured, which extends substantially at right-angles to the geometrical central axis and has a portion defining a cut-out around the geometrical central axis. Such device also has illuminating means for lighting the surface through the cut-out.

BACKGROUND OF THE INVENTION AND RELEVANT PRIOR ART

Such a device is described, for example, in U.S. Pat. No. 4,597,093, issued June 24, 1986. In this patent, it is possible to look through the viewing microscope 78 and observe the under side 92 of the coating 93 which is illuminated by a light source 94. The coating lies on a working panel 18 which can be moved in the direction 24 and/or 26 by a precision transmission 27, 29. The working panel 18 is relatively small. Relatively large objects would hang down below the working panel 18 and would not have a rugged support because the panel 17 is of course lower down than the working panel 18.

The coating can also move while one is working on the instrument table, if something falls against the table or if by chance a garment fouls the device or the latter is struck by the knee or by a chair falling over or suffers similar mishaps.

It can, however, also happen that the object to be measured will in course of time creep or internal stresses may become noticeable so that the object moves like a transparency and so alters its position.

The device is not suitable for rapid and thus economic viewing of printed circuit boards which have to be pushed quickly back and forth over the clearance hole. Aligning the object to be measured with the geometrical longitudinal axis 32 is carried out by a single eye since a stereomicroscope would be too expensive. If the object to be measured is moved quickly, then the eye tires within a short time.

OBJECT AND STATEMENT OF THE INVENTION

The object of the invention is to provide a device which makes it possible to quickly and accurately position and test objects of relatively large-size without fatigue and in a gentle way. Particularly in the case of printed circuit boards, for example, the through-connections can easily be found, positioned, and held securely throughout the period of the test.

According to the invention, this object is achieved by the following features:

(a) A video camera is located in the path of light rays from the illuminating means at the viewing position of the viewing means.

(b) A video display is controlled by the electronic eye.

(c) A table with a top having an edge and a surface area of at least 400 sq. cm. comprises the support means.

(d) Depressor means is provided above the cut-out and has a pressure-applying face moveable between an upper and a lower position, the upper position being at least high enough that the object to be measured can be pushed between the pressure-applying face and the table.

(e) The pressure-applying face applies a force when in the lower position to press the object to be measured against the top of the table and hold the object in a non-positive manner.

(f) Switchable means is provided for moving the depressor means into the upper and the lower positions.

(g) The pressure-applying face is located about the geometrical central axis of the X-rays, the distance between the pressure-applying face and the geometrical central axis being far less than the distance from the geometrical central axis to the edge of the table.

(h) The cut-out in the table has a very much larger area than the cross-section of the X-ray beam.

Now there is no longer any need to hold one's eye up to the eyepiece 79 according to the state of the art shown in U.S. Pat. No. 4,597,093. Instead, the head can be held over the table. In this respect, "table" denotes an apparatus of relatively large area compared with "plate", "small table", "support" or the like. The size of the table means that, statistically the object to be measured does not always project beyond the edge of the table so that moving it about on the table by hand is also easier. The table according to the invention does not require any microscopic transmission. As used in this specification, the term "electronic eye" means video camera and the term "image screen" means video display.

It is now possible to watch an image screen with both eyes, in other words, without tiring, and it is no longer necessary to position the eye within one definite region in relation to the eyepiece in order to view the area of measurement.

While in its upper position, the depressor means provides for a rapid search facility on the image screen. In this respect, the image screen shows a view corresponding to that in FIG. 6 of the above-mentioned United States Patent, which remain stationary while the object to be measured is moved in relation thereto. When the depressor means is in the lowered condition, it holds the test object sufficiently securely but without damaging it. If the switch is a foot switch, then—without releasing the object—the depressor means can be lowered so that positioning is possible more quickly and accurately and with less tendency to cause fatigue.

The light is used not only to illuminate the area under test, but also for positioning purposes. Since the illuminating device is directed at the aperture, this provides an approximate positioning because for instance the light shimmers through printed circuits. It is possible then to see approximately which area of the test object is disposed above the opening in the table. This coarse-positioning is rapid.

The distance of the pressure-applying face according to partial feature (g) means that specific areas of the depressor means can remain small and that, above all, the pressure-applying effect does not vary towards the geometrical central axis, which would be the case if the pressure-applying face were to act farther out.

The partial feature (h) means that in the case of printed circuits or other translucent objects which are to be measured, a sufficiently large spot of light is formed on the upper side of the object under test. The upper side does not have to be measured.

Advantageously, the invention includes the following additional features.

The electronic eye is a CCD camera. As a result of this feature, a camera is provided which is flat, long-lived and generates little additional heat.

The device has a front side and the electronic eye is set up in front of and is rigidly connected to the device on the front side. As a result, a major part of the optics known from the state of the art can be easily incorporated, and the device can be basically left as it is. The device then forms one unit together with the electronic eye.

A frame is rigidly connected to the device and the image screen is situated behind the device on the frame. As a result, a fixed relationship is obtained between image screen and device, which can if necessary be transported together, and after possible dismantling or assembly the same configuration is quickly regained. It is possible to manage with only a small space and no special additional laboratory tables are required.

The overall contours of the table are at least as large as those of the device itself. This feature provides a table which is of optimum size, without the overall contours of the device being larger. Such a construction is space-saving and means that other instruments can be set up close by.

The table is flexurally resistant to the force of pressure applied by the depressor means. As a result, once it has been applied, the force of the pressure does not shift the location of the test object.

The table has a plurality of upwardly projecting raised portions. This means that the test object is only supported spotwise, which ensures a reliable location of the test object. Many objects such as, for example, printed circuits, do of course have projecting surface areas, and the raised area prevents the object from wobbling when held.

The raised portions have round tops. This feature protects areas of the test objects and prevents the test object fouling the raised portions when it is being moved about.

The table has depressions therein, and concentrically-contained balls are mounted fittingly in the depressions to permit rotation of the balls. The balls peep out upwardly, as ball caps that comprise the raised portions of the balls. As a result of these features, it is possible to push even relatively heavy objects back and forth for test purposes. The friction between the balls and the object being tested is low so that the danger of the object being damaged while it is being moved is also low.

The ball caps peep outward upwardly by less than one-third of the diameter of the balls. This feature on the one hand provides for sufficiently high raised portions, while on the other the ball caps can be reliably guided in the table.

Raised portions are provided close to the geometrical central axis and are disposed symmetrically around the geometrical central axis. This means that the areas of the object to be measured can be subjected to a symmetrical loading by the applied force around the central axis, so that if any sag or deflections occur, they will at most be symmetrical but never one-sided.

More raised portions are disposed around the geometrical central axis than in more outer areas of the table relative to the geometrical central axis. In consequence of this feature, the force of the applied pressure is best absorbed where it occurs, whereas the areas with few raised portions serve only to facilitate displacement of the object being measured.

A transparent film covers the cut-out which does not adversely affect X-rays. This feature prevents any dirt which may arise during displacement of the objects to be measured from falling down into the device.

The table consists of polyamide. This feature prevents any splinters occurring on the table; it can easily be kept clean and the material is self-lubricating.

The table and the balls consist of the same polyamide. This feature provides a material that is to an optimum degree compatible with the table material and which also offers the advantages thereof.

The depressor means is adapted to allow a view of the cut-out. In consequence of this feature, anyone can see whether any dirt is present on the film, and it is possible to see whether the film is in the right position. It is also possible to see with the naked eye the spot of light shining through the object to be tested.

The depressor means comprises a bell having a side wall which is at least partially transparent. This feature provides a rigid, easily constructed, component element whose properties are readily foreseeable, and which can above all trap stray radiation which may occur as secondary radiation. In spite of this, one can see into the area of measurement.

The bell has a top wall which is arranged to provide an X-ray trap. This feature makes it possible to trap X-rays irradiated in the direction of the central axis, without influencing the side wall.

The X-ray trap has a downwardly-open cup coaxial with the geometrical central axis. By virtue of this feature, above all the core of the X-rays can be trapped especially well through the thick-walled cup.

The X-ray trap has, coaxial with the geometrical central axis, a disc that at least partially covers the top wall. As a result of this feature, it is also possible to trap those X-rays which diverge like a paintbrush. The trapping device nevertheless remains light if the main mass of the absorbing material is absorbed in the cup and if the disc which is then made thinner is also used at the same time to support the top wall of the bell.

The disc is mounted above the cup. It is also possible for the disc to hold the cup. The thin disc does not interfere with the view if one looks obliquely downwards. The cup which projects relatively far downwardly does not interfere because it does not mask the opening in the direction of view.

The bell is of organic glass, with a bottom end face perpendicular to the geometrical central axis, which is the pressure-applying face. Accordingly, the glass does not shatter which might be the case due to unevenness of the objects to be measured, and which also be the case because of the force of the applied pressure. Furthermore, the bell need not then be placed so gently on the object to be measured.

The glass is colorless and transparent. This affords the best view into the bell.

The bell has a bottom end face and upwardly-extending small recesses machined into the bottom end face. By virtue of these features, narrow, strip-like objects also can be measured, optimum positioning by the bell being feasible.

A supporting arm extends above the table, which absorbs the force of the applied pressure. This supporting arm interferes neither with working nor with the view of the image screen.

The supporting arm is rigidly connected to the device. This feature gives rise to a frictional connection within the device in respect of the force of the applied pressure.

The supporting arm is a part of a gallows-like structure comprising a tube with a fixing arm attached to the back of the device. A particularly favorable attachment is afforded, causing minimal interference, and being very flexurally rigid.

The supporting arm extends centrally above the table and the fixing arm extends further centrally. These features mean that the table can be loaded from both sides and from the front in the same way, the retaining forces being symmetrically accommodated.

The supporting arm has a free end portion, the switchable means comprises an electromagnet fixed on the free end portion of the supporting arm, and transmission means are driven by the electromagnet for moving the pressure-applying face upwards and downwards. In itself, the supporting arm could also be moved up and down. A substantially mass-free movement is, however, obtained as the result of these features. The movement per se could also be generated by a manually actuated transmission. A pneumatic or hydraulic movement would also be conceivable. The solution indicated here is, however, the simplest since it diverges least from viewing and two-handed movement of the object to be measured, the voltage for the electromagnet being derived from the input transformer which is provided in any case.

The electromagnet has an armature and stands perpendicular, and the transmission means comprises a rod having one end connected to the armature of the electromagnet and another end connected to the bell. The transmission is most simplified by these features. Certainly, then, the electromagnet is positioned in front of the supporting arm. The electromagnet could also be accommodated in the supporting arm and in this case, the transmission is a force-deflecting lever arrangement.

The bell is adapted to rotate about its vertical axis. By reason of this feature, it is possible to move the bell into that position which is most suitable for measurement purposes. This, for example, if the bell is not equally transparent at all its locations or if the bell has marginally open cut-outs to accommodate strip-like objects which are to be tested.

The pressure-applying face is comprised of hard material. This feature makes it possible to prevent the test object and the bell from performing creeping movements after the pressure-applying force is applied.

The applied pressure has a maximum force which allows a printed circuit or similar board-like object to be measured to be moved manually in the millimeter range in relation to the table. This feature permits a little readjustment.

DESCRIPTION OF THE DRAWINGS

The invention will now be described with reference to a preferred embodiment. The centimeter scale applicable to FIGS. 1 to 4 is shown in FIG. 2.

In the accompanying drawings:

FIG. 3 shows the device in FIG. 1, viewed from the right;

FIG. 4 shows the device in FIG. 1, viewed from the rear;

DETAILED DESCRIPTION

Figure 1:
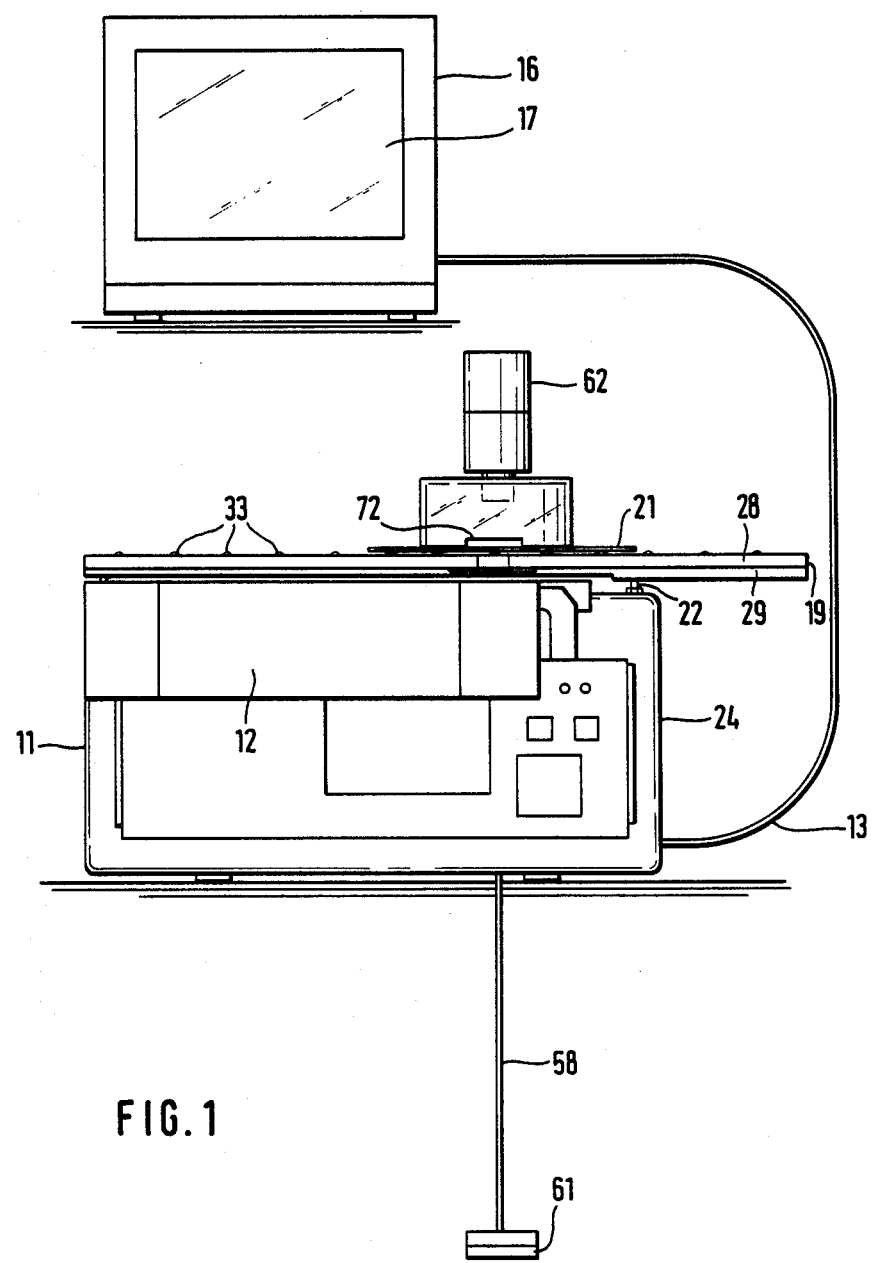
FIG. 1 shows the device viewed from the front side.
Figure 6:
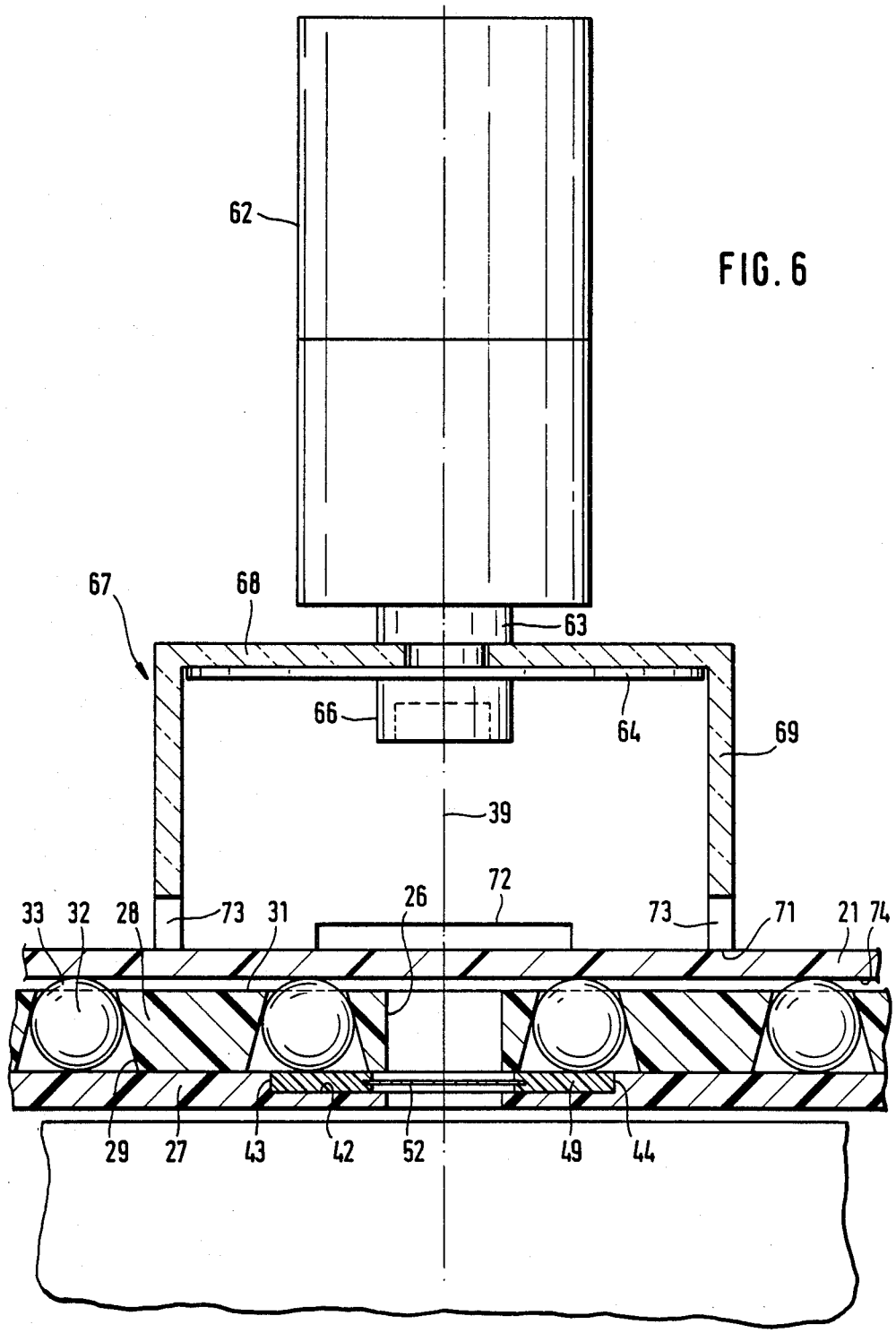
FIG. 6 shows an enlarged view in the region of the central axis, partly in section.

A rugged instrument casing houses an instrument for measuring the thickness of thin coatings by the X-ray fluorescence principle. Instruments of this type are available from various manufacturers. One of them is described, for example, in U.S. Pat. 4,597,093. Where that specification discloses a viewing microscope device 78, here there is a casing 12 containing an electronic eye which records the image which the human eye would otherwise register. As FIG. 3 shows, the casing 12 extends for quite a distance leftwards. From the casing 12, a video line 13 extends internally to the back 14 of the instrument casing, which leads from there to an image screen apparatus 16 comprising an image screen 17. Provided on the back 14 are vertically extending ribs 18. Fixed to these is a frame, not shown, which holds the image screen apparatus 16 in a spatial position shown in FIG. 1, so that a person whose bent forearms are approximately at the height of a table 19 can look straight at the image screen 17. When the device is switched on, there appear on the image screen 17 intersecting reference lines as shown in FIG. 6 in the state of the art U.S. Pat. No. 4,597,093. If a printed circuit is placed on the table 19, then one sees in a substantially enlarged view the underside of this printed circuit 21. Measurement then takes place according to the location and size of the through-bores 58, 59, 61, 62, 63 (these reference numerals are from the state of the art U.S. Pat. No. 4,597,093) within the square shown in FIG. 6.

The light needed to operate the electronic eye emanates, in the case of the present invention, from a light source similar to the light source 94 used in U.S. Pat. No. 4,597,093.

Provided on the top of the instrument casing 11, in its four corner areas, are rotatable threaded screws 22 which support the table 19 in the regions located above them. According to how far and in what direction the threaded screws 22 are turned, the orientation of the table can be adjusted.

The area of the table is substantially larger than the top of the instrument casing 11. In particular, it projects sufficiently far beyond the front 23 that the casing 12 is covered at the top so that not only is table area gained but also the casing 12 is protected (see FIG. 3).

Figure 2:
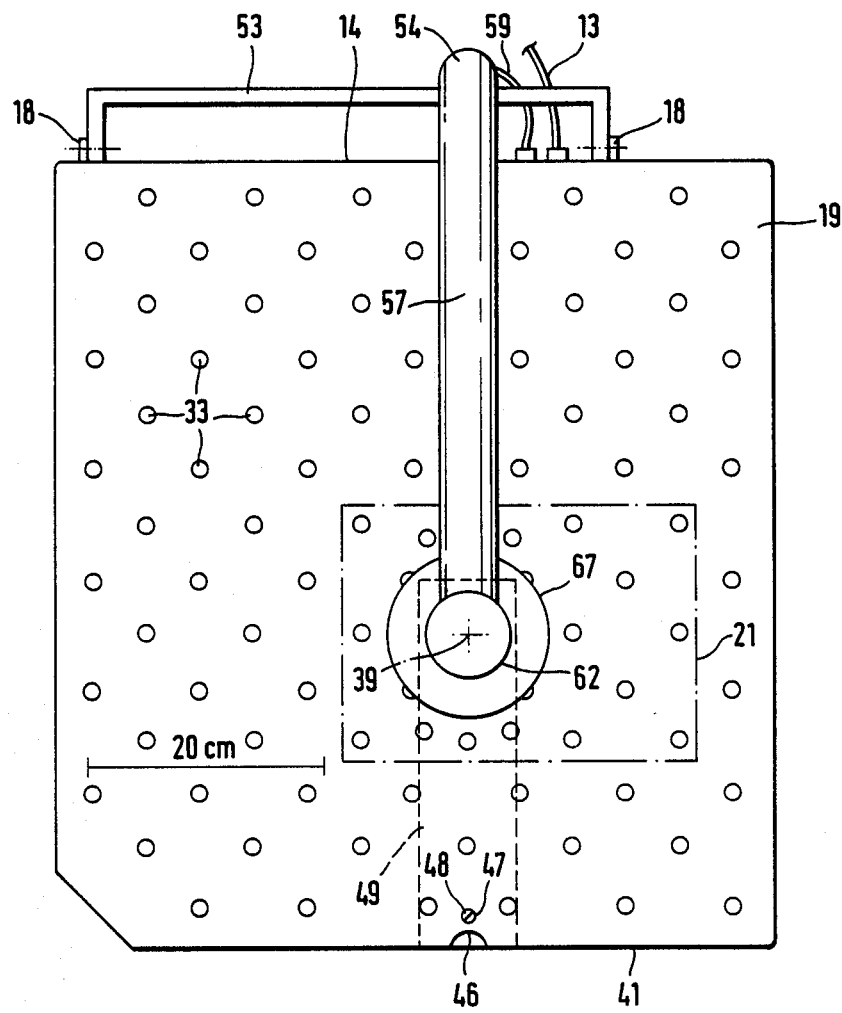
FIG. 2 shows a plan view of FIG. 1 without the image screen.

The table 19 also projects considerably beyond the right side 24 of the instrument casing 11 so that sufficient surface area is obtained to the right of a cut-out 26 in the table 19. As can be seen particularly in FIG. 2, the cut-out 26 is relatively far forwards and on the right in relation to the instrument casing 11 and the table overhangs compensate for this substantially.

The table 19 consists of a relatively thin bottom panel 27 and an upper panel 28 which is substantially thicker than the bottom panel 27, both panels being bolted together in a manner not illustrated, in such a way as to form a single table.

Provided in the upper panel 28 are frustoconical bores 29 which extend through it upwards and of which the larger diameter is adjacent the lower panel 27, while the smaller diameter merges into the top 31 of the upper panel 28. These bores 29 are closed at the bottom by the lower panel 27. Located in the bores 29 are balls 32, all the balls being of the same size and being of such a fit that the balls 32 can rotate. The shape of the bores 29 is such that the balls 32 have a ball cap 33 peeping out of the top, the height of the cap being about one-fifth of the ball diameter.

Figure 5:
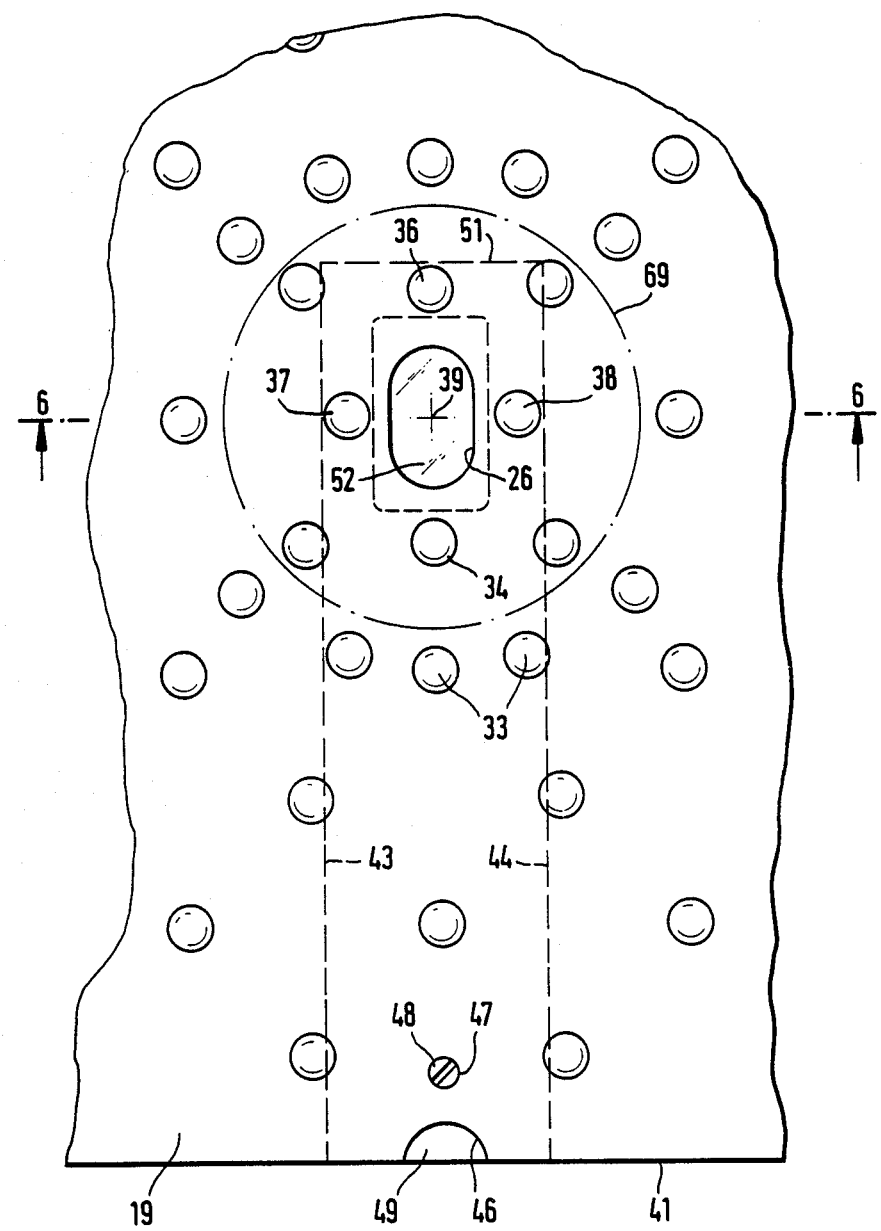
FIG. 5 shows an enlarged plan view of an area of the table indicating the bell.

As FIG. 5 shows, the density of balls around the cut-out 26 is greater than in those areas which are remote from the cut-out. Furthermore, the balls 34, 36, 37, 38 are so located they are in pairs symmetrical to the geometrical central axis 39 which corresponds to the geometrical longitudinal axis 32 known from the state of the art U.S. Pat. No. 4,597,093.

As FIG. 5 shows, the cut-out 26 is oval in shape. The oval central point lies, however, likewise in the geometrical central axis 39.

Provided in the lower panel 27 and starting from the front edge 41 of the table there is an open topped drawer-like recess 42 of which the bottom is flat and the side walls 43, 44 are straight and extend parallel with each other, extending a little beyond the cut-out 26 (FIG. 5).

Provided both in the lower panel and also in the upper panel 28 is a handle recess 46 in the region of the recess 42 and extending from the front edge 41. Provided behind the handle recess 46 is a throughbore 47 in which a screw 48 fits.

In the recess 42 there is a synthetic plastic slide 49 of rectangularly elongate form, which fits the recess 42. It can be drawn out in a straight line frontwards from the recess 42 once the screw 48 has been removed. In the region of the recess 26, the slide 49 has a rectangularly elongated recess 51, the area of which is substantially greater than the recess 26 and the central point of which is also the geometrical central axis 39. The recess 51 accommodates an approximately 20 um thick film 52 of Mylar ® (Registered Trademark of DuPont). The film 52 does not interfere with the X-rays and is virtually no hindrance to the light source, not shown, which shines from the bottom into the recess 26. However, it does prevent dirt dropping down. Dirt can be removed by pulling out the slide 49.

Fixed on the back 14 of the instrument casing 11 on the ribs 18 by screws is a rigid curved bracket 53. In its right-hand zone (according to FIG. 2) an overhanging arm 54 is fixed, which is bent in one piece from a flexurally rigid metal tube, the fixing arm 56 extending vertically upwards from the curved bracket 53 and then, after making a 90 degree bend, merging into a supporting arm 57 which extends parallel with the table 19 from which it is spaced by a comparatively small distance and which, extending forwards, reaches not quite as far as the geometrical central axis 39.

Electrical conductors 58, 59 extend through the overhanging arm 54. The conductor 58 (a twin core conductor) goes to a foot switch 61 with a foot plate while the conductor 59 goes to the instrument casing 11.

With the foot switch 61 it is possible via the conductor 59 to operate an electromagnet 62 which is rigidly mounted at the free end of the supporting arm 57, so that its geometrical longitudinal axis is aligned with the central axis 39. If the foot switch 61 is depressed, then the armature (not shown) of the electromagnet 62 moves into its bottom position. If the foot switch 61 is released then the armature moves into its upper position. The location of the armature is made known via the conductor 59 into the instrument casing 11 so that it is informed of whether it is possible to measure or not.

Emerging from the bottom of the electromagnet 62 is a rod 63 at the bottom end face of which there is a plate 64 which is of sheet iron and a few millimeters thick. It is circular and its diameter according to FIG. 5 goes far beyond that of the cut-out 26. Screwed from the underside against the plate 64 is an open-bottom cup 66 which is likewise coaxial with the geometrical central axis 39 and which consists of iron. It has a coaxial screw (not shown) which at the same time also secured the plate 64 to the rod 63.

The rod 63 also carries a bell 67 of glass-clear acrylic material. Its top 68 is situated above the plate 64. The top 68 is rigid in an axial direction but is (like the plate 64 and the cup 66) rotatably connected to the rod 63.

Outwardly, the top 68 merges at a right-angle into a circularly cylindrical side wall 69 which projects downwardly and which is coaxial in relation to the geometrical central axis 39. This produces the open-bottomed bell 67 which has at the bottom a circular end face 71. Offset by in each case 180 degrees there is machined into the bottom a relatively broad but flat downwardly marginally open cut-out 72 and, offset by 90 degrees thereto, there is also machined a relatively narrow but higher cut-out 73.

In the upper location of the rod 63 the end face 71 is considerably above the position shown in FIG. 6 so that the printed circuit 21 can be pushed back and forth freely over the cut-out 26. In the position shown in FIG. 6, the end face 71 exerts a force on the top of the printed circuit 21 which is then absorbed by the apex of the relevant ball caps 33 and then by the lower panel 27.

In operation, the printed circuit 21 is pushed into the desired position while one is watching the image screen 17. As it is pushed back and forth, the underside 74 of the printed circuit 71 is still not sharply depicted in the electronic eye and a somewhat unfocused image will accordingly appear on the screen 17. However, this is sufficient to determine approximately in which area the geometrical central axis 39 is being traversed. If the foot switch 61 is then depressed, then the underside 74 is applied in a definite manner against the tops of the balls 32 and the plane defined thereby is then the sharp image plane. The image screen 17 now shows sharply that area which is around the geometrical central axis 39. If the visible area is not exactly in the area to be measured, then with increased but nevertheless still minimal application of force, the printed circuit 21 can be pushed on by the small amount necessary while the bell 67 is still depressed.

I claim:

1. Device for measuring the thickness of a thin layer according to the X-ray fluorescence method comprising an X-ray detector and a source of X-rays with a beam with a geometrical central axis that passes through the layer to be measured, said device having:
   viewing means, having a viewing position for observing the area of the surface of the layer through which said geometrical central axis of the X-ray passes,
   support means for supporting objects which are to be measured,
   said support means extending substantially at right-angles to said geometrical central axis and having a portion defining a cut-out around said geometrical central axis,
   illuminating means for lighting said surface through said cut-out, and the improvement wherein:
   (a) a video camera is located in the path of light rays from said illuminating means at said viewing position of said viewing means, (b) a video display is controlled by said video camera,
(c) a table with a top having an edge and a surface area of at least 400 sq. cm. comprises said support means,
(d) depressor means is provided above said cut-out and has a pressure-applying face movable between an upper and a lower position, said upper position being at least high enough that the object to be measured can be pushed between said pressure-applying face and said table,
(e) said pressure-applying face applies a force when in said lower position to press the object to be measured against said top of said table and hold said object in a non-positive manner,
(f) switchable means is provided for moving said depressor means into said upper and said lower positions,
(g) said pressure-applying face is located about said geometrical central axis of said X-rays, the distance between said pressure-applying face and said geometrical central axis being far less than the distance from said geometrical central axis to said edge of said table, and
(h) said cut-out in said table has a very much larger area than the cross-section of said X-ray beam.

2. Device according to claim 1, wherein said video camera is a CCD camera.

3. Device according to claim 1, wherein said device has a front side and said video camera is set up in front of and is rigidly connected to said device on said front side.

4. Device according to claim 1, comprising a frame rigidly connected to said device, wherein said video display is situated behind said device on said frame.

5. Device according to claim 1, wherein the overall contours of said table are at least as large as those of said device itself.

6. Device according to claim 1, wherein said table is flexurally resistant to the force of pressure applied by said depressor means.

7. Device according to claim 1, comprising a transparent film, which does not adversely affect X-rays, covering said cut-out.

8. Device according to claim 1, wherein said table consists of polyamide.

9. Device according to claim 1, wherein said pressure-applying face is comprised of hard material.

10. Device according to claim 1, wherein the applied pressure has a maximum force which allows a printed circuit or similar board-like object to be measured to be moved manually in the milli-meter range in relation to said table.

11. Device according to claim 1, wherein said table has a plurality of upwardly projecting raised portions.

12. Device according to claim 11, wherein said raised portions have round tops.

13. Device according to claim 11, wherein raised portions are provided close to said geometrical central axis and are disposed symmetrically around said geometrical central axis.

14. Device according to claim 11, wherein more raised portions are disposed around said geometrical central axis than in more outer areas of said table relative to said geometrical central axis.

15. Device according to claim 11, wherein said table has depressions therein, and concentrically-contained balls are mounted fittingly in said depressions to permit rotation of said balls and from which said balls peep out upwardly, as ball caps that comprise said raised portions.

16. Device according to claim 15, wherein said ball caps peep outward upwardly by less than one-third of the diameter of said balls.

17. Device according to claim 15, wherein said table and said balls consist of the same polyamide.

18. Device according to claim 1, comprising a supporting arm extending above said table, which absorbs the force of the applied pressure.

19. Device according to claim 18, wherein said supporting arm is rigidly connected to said device.

20. Device according to claim 18, wherein said supporting arm is a part of a gallows-like structure comprising a tube with a fixing arm attached to the back of said device.

21. Device according to claim 20, wherein said supporting arm extends centrally above said table and said fixing arm extends further centrally.

22. Device according to claim 18, wherein said supporting arm has a free end portion, said switchable means comprises an electromagnet fixed on said free end portion of said supporting arm, and transmission means are driven by said electromagnet for moving said pressure-applying face upwards and downwards.

23. Device according to claim 22, wherein said electromagnet has an armature and stands perpendicular and said transmission means comprises a rod having one end connected to said armature of said electromagnet and another end connected to said bell.

24. Device according to claim 1, wherein said depressor means has means to allow a view of said cut out.

25. Device according to claim 24, wherein said depressor means comprises a bell having a side wall which is at least partially transparent.

26. Device according to claim 25, wherein said bell is adapted to rotate about its vertical axis.

27. Device according to claim 25, wherein said bell has a bottom end face and upwardly-extending small recesses machined into said bottom end face.

28. Device according to claim 25, wherein said bell is of organic glass, with a bottom end face perpendicular to said geometrical central axis, which is said pressure-applying face.

29. Device according to claim 28, wherein said glass is colorless and transparent.

30. Device according to claim 25, wherein said bell has a top wall which is arranged to provide an X-ray trap.

31. Device according to claim 30, wherein said X-ray trap has a downwardly-open cup coaxial with said geometrical central axis.

32. Device according to claim 31, wherein said X-ray trap has, coaxial with said geometrical central axis, a disc that at least partially covers said top wall.

33. Device according to claim 32, wherein said disc is mounted above said cup.

* * * * *